United States Patent Office 2,885,365

Patented May 5, 1959

2,885,365

RUTHENIUM-MODIFIED CHROMIUM OXIDE FERROMAGNETIC COMPOSITIONS, THEIR PREPARATION AND USE

Alfred L. Oppegard, Wilmington Manor, Del., assignor to E. I. du Pont de Nemours and Company, Wilmington, Del., a corporation of Delaware

No Drawing. Application October 22, 1956 Serial No. 617,283

12 Claims. (Cl. 252—62.5)

This invention relates to ferromagnetic materials and their preparation. More particularly, it relates to a new type of ferromagnetic chromium oxide, to a method for its preparation, and to magnetic recording members having this new type of ferromagnetic chromium oxide as the magnetic component.

Ferromagnetic materials are employed in a variety of applications. For example, these materials are used in magnetic sound recording tapes, drums, and records, memory devices, microwave circuitry, and as magnetic cores, such as coil cores in electronic equipment. In some of these applications, especially those requiring magnetic materials of low loss characteristics at high frequencies, or of relatively high coercive force, ferromagnetic oxides are normally more useful than ferromagnetic metals. Heretofore only cobalt, nickel or iron alloys or magnetic iron oxides have been used in the manufacture of magnetic recording tapes.

Among the known ferromagnetic oxides is cromium dioxide. However, the commonly known forms of this oxide have not possessed the purity, magnetic properties, and uniform small particle size which would make them useful in certain practical applications, e.g., in the manufacture of magnetic recording tapes, magnetic memory cores for computers, gyrator elements, etc.

Recently two new forms of ferromagnetic chromium oxides having certain combinations of properties making them particularly useful in various applications have been prepared. These new chromium oxides have had average particle sizes less than 10 microns in length and have had a tetragonal crystal structure. One of these forms of a ferromagnetic chromium oxide has had an elongated shape (the length being from 2 to 6 times the width) and is described and claimed in U.S. Patent application Serial No. 515,521, filed June 14, 1955, by Paul Arthur, Jr. The second of the new ferromagnetic chromium oxides has the same general particle length but a more acicular shape (the length being from 8 to 20 times the width) and contains a small amount of an alkali metal as an integral constituent of the crystal lattice. This latter type is described and claimed in U.S. Patent application Serial No. 515,523, filed June 14, 1955, by T. J. Swoboda. Both these two new types of ferromagnetic chromium oxides have certain magnetic properties which make them of value in certain applications. However, their intrinsic coercive forces have ranged only from about 35 to about 115 oersteds. For some applications, ferromagnetic chromium oxides having still higher intrinsic coercive forces are desired, and it is therefore an important goal to provide chromium oxides of the desired high coercive force.

It is an object of this invention to provide ferromagnetic materials or compositions of high coercive force and a method for their preparation. A further object is to provide a new type of ferromagnetic chromium oxide of high coercive force and method for its preparation. A still further object is to provide a novel process for preparing a ferromagnetic chromium oxide of high coercive force. Another object is to provide a new type of ferromagnetic chromium oxide which is especially useful in the manufacture of magnetic recording tapes and in the manufacture of ceramic bodies such as magnetic cores. Still another object is to provide a magnetic recording member having a magnetic track comprising this new type of ferromagnetic chromium oxide. Other objects will appear hereinafter.

These and other objects of this invention are accomplished by providing ferromagnetic chromium oxides containing 0.008% to 4.4% of ruthenium and 58,4% to 61.9% of chromium. The ruthenium-modified ferromagnetic chromium oxides of this invention are produced in a form which consists essentially of small acicular particles of tetragonal crystal structure having an average length of not more than 2 microns with no more than 10% of the particles having a length greater than 2 microns, and having an axial ratio, i.e., the ratio of length to width, within the range of 4–35:1. The ruthenium-modified chromium oxides of this invention have an intrinsic coercive force greater than 140 oersteds, the preferred chromium oxides having an intrinsic coercive force ranging between 200 and 400 oersteds. The ruthenium-modified chromium oxides of this invention also possess high sigma values, i.e., high specific magnetizations, these values ranging from 65 to 85 electromagnetic units per gram (e.m.u./g.), with the preferred ruthenium-modified oxides having sigma values ranging between 70 and 85 e.m.u./g. The chromium oxides of this invention have a Curie temperature of about 125° C.

It has been found that the novel ferromagnetic ruthenium-modified chromium oxides of this invention have magnetic and physical properties rendering them especially useful as the magnetic material in magnetic recording members. Accordingly, the present invention further provides magnetic recording members which comprise a carrier, such as a tape, drum or record, of non-magnetic material having bonded thereto a magnetic track of the ferromagnetic chromium oxide of this invention and a binder therefor.

The new ferromagnetic chromium oxide compositions of this invention are prepared by the novel process which comprises heating chromium trioxide, $CrO_3$, at a temperature within the range of 300° to 500° C. under a pressure of at least 200 atmospheres in the presence of water and from 0.01% to 5% or more, based on the weight of the chromium trioxide, of ruthenium dioxide, $RuO_2$, and separating and drying the resulting magnetic chromium oxide of high coercive force.

The process of this invention is conveniently carried out as follows: A corrosion-resistant container, i.e., a container constructed of a material which is inert to the reactants under the reaction conditions, is used. Satisfactory containers are made of platinum or of the alloy known commercially as "Hastelloy" C. The container can be a completely sealed tube having flexible walls or it can be any type of vessel permitting transmission of the desired pressure to the reaction system, such as a cylindrical tube closed at one end and equipped at the other end with a closely fitted piston, or a pressure-resistant vessel having a corrosion-resistant lining. The container is charged with chromium trioxide, 0.01% to 5%, preferably 0.1% to 1.5% of ruthenium dioxide (the finely divided material available commercially) based on the weight of chromium trioxide, and from 0.1 to 6.0 parts of water for each part of chromium trioxide. Preferably an amount of water ranging from 20% to 125% of the weight of the chromium trioxide is used. The corrosion-resistant container (of the type that is placed inside a larger pressure vessel) is then closed and placed inside a larger vessel capable of withstanding high temperatures and pressures. The outer vessel is then closed and pressured with an inert liquid or gas, e.g., water or helium, so that at the operating temperature the pressure is at least 200 atmospheres. Good results are obtained with pressures ranging from 200 to 3000 atmospheres. Pressures above 3000 atmospheres can be used if the available equipment is strong enough to withstand them. The reaction vessel is then heated to a temperature between 300° and 500° C., preferably between 325° C. and 450° C. Temperatures above 500° C. are not desirable since they cause decomposition of the ferromagnetic chromium oxide.

The reaction times are not critical. Periods ranging from a few minutes, e.g., five minutes, to three hours or more at the reaction temperature of 300° to 500° C. are sufficient. Longer times are not necessary to form the ferromagnetic, ruthenium-modified, chromium oxides of this invention. Likewise, the time of heating the reaction vessel to the reaction temperature and the time of cooling it back, after reaction is completed, can vary considerably, depending on the size of the vessel and the charge and on the capacity of the heating and cooling equipment. However, it is preferred that heating to reaction temperature be completed in less than one hour and that cooling be completed in 24 hours.

After the reaction mixture has been heated to the desired operating temperature for the desired time, the entire reaction vessel is cooled with the pressure maintained until room temperature, about 25° C., is reached. The pressure is then released and, if a sealed corrosion-resistant vessel is employed, this may result in it being ruptured by the by-product oxygen present in the container. The resultant slightly compacted, or aggregated, black acicular chromium oxide is separated from the dark-colored aqueous phase by filtration and is then washed and dried. A convenient way of doing this is to break up the lumps of crude reaction product in a mortar. This treatment merely breaks up the aggregates; it does not reduce the size or change the shape of the individual particles. The finely divided product is then washed by immersing it in distilled water and heating the water to boiling, followed by filtration. The washing in distilled water, is repeated two more times and then the product is collected on a filter, rinsed thoroughly with distilled water, and finally with acetone, and then allowed to air dry, but preferably the product is dried more thoroughly at elevated temperature and reduced pressure.

Instead of using the commercially available, finely divided ruthenium dioxide as the modifying agent in the process of this invention, a ruthenium-modified chromium oxide prepared as described above can be used for the preparation of more high coercive force ruthenium-modified chromium oxide. It is only essential in this embodiment to use a chromium oxide containing sufficient ruthenium dioxide to provide at least 0.01% ruthenium dioxide, based on the weight of chromium trioxide being reacted. In fact, the ruthenium dioxide in the ruthenium-modified chromium oxide is more effective as a catalyst in this process than the finely divided commercial ruthenium dioxide itself. Consequently, the preferred amount of ruthenium-modified chromium oxide to use in this embodiment of the process is that which provides from 0.01% to 0.1% of ruthenium dioxide, based on the weight of chromium trioxide being reacted.

The ruthenium dioxide may be firmly absorbed on the surface of the chromium oxide particles or chemically combined with the chromium oxide. There is some reason to believe that chemical combination may occur since the crystal structure of ruthenium dioxide is similar to that of these ferromagnetic chromium oxides; hence, chemical modification is possible. In any case, all the high coercive force chromium oxides of this invention contain small amounts, i.e., from 0.008% to 4.4%, of ruthenium.

As indicated above, the ferromagnetic ruthenium-modified chromium oxides of this invention possess a number of properties or characteristics which make them especially suitable for use in certain applications. In addition to their being of very small particle size as defined above, these acicular particles also possess a more uniform thickness than hitherto known acicular chromium oxides and are believed to be single crystals. On the basis of theoretical calculations, the particle size is below the maximum limit for single domain particles. Single domain particles are especially useful in certain magnetic applications. As indicated above, they have an average length of less than two microns and an axial ratio of 4 to 35:1, with substantially all the particles having widths ranging between 0.02 and 0.2 micron. This acicular shape makes them especially well adapted for use in coating compositions applied on films, tapes or other substrates. As a result of this acicular shape, the particles can be oriented in closer relationship during the mechanical spreading of the oxide composition in thin layers on a substrate. This in turn results in more uniform magnetic characteristics of the coated substrate.

The tetragonal crystal structure of the chromium oxides of this invention is of the rutile type, i.e., it has the same type of crystal structure as rutile, $TiO_2$. Ferromagnetic chromium oxides prepared by hitherto known methods have also exhibited this tetragonal crystal structure but in all oxides other than those of the aforementioned Arthur and Swoboda applications it has always been associated with other crystal structures besides the rutile-type structure, e.g., the corundum-type hexagonal crystal structure of $Cr_2O_3$. In contrast, the ferromagnetic chromium oxides of this invention have only a single crystal structure as shown by X-ray diffraction, i.e., solely the tetragonal crystal structure of the rutile type.

The ferromagnetic ruthenium-modified chromium oxides of this invention exhibit several magnetic characteristics which make them especially valuable for use in various applications. These particular properties, which have been mentioned previously, and which are critical factors in their usefulness in certain applications, are the intrinsic coercive force, $H_{ci}$, and the sigma value, $\sigma_s$, also known as the saturation magnetic moment per gram. The definition of the intrinsic coercive force, $H_{ci}$, is given in Special Technical Publication No. 85 of the American Society for Testing Materials, entitled "Symposium on Magnetic Testing" (1948), pages 191–198. The values for the intrinsic coercive force given herein are determined on a D.C. ballistic-type apparatus which is a modified form of the apparatus described by Davis and Hartenheim in the Review of Scientific Instruments 7, 147 (1936). The sigma value, $\sigma_s$, is defined on pages 7 and 8 of Bozorth's "Ferromagnetism," D. Van Nostrand Company, New York (1951). This sigma value is equal to the intensity of magnetization, $I_s$, divided by the density, $d$, of the material. The sigma values given herein are determined on apparatus similar to that described by P. R. Bardell on pages 226–228 of "Magnetic Materials in the Electrical Industry," Philosophical Library, New York (1955).

In some applications a ferromagnetic material having a high intrinsic coercive force is required. The chromium oxides of this invention exhibit intrinsic coercive forces significantly greater than those of the ferromagnetic chromium oxides prepared in the presence of water only as described in the aforementioned patent application Serial No. 515,521, and in the presence of an alkali metal sulfate as described in the aforementioned patent application Serial No. 515,523. The intrinsic coercive forces of the chromium oxides of these aforementioned patent applications range up to a maximum of about 115 oersteds. In contrast to this, the chromium oxides of the present invention exhibit coercive forces of at least 140 oersteds and those prepared under the optimum conditions exhibit coercive forces of 200–400 oersteds. Ferromagnetic oxides having such exceptionally high intrinsic coercive forces are especially suitable for use in magnetic recording tapes.

The ferromagnetic ruthenium-modified chromium oxides of this invention also possess superior sigma values in comparison with gamma ferric oxide which is now used commercially in the manufacture of magnetic recording tapes. The sigma values, $\sigma_s$, of the products of this invention range from 65 to 85 e.m.u/g. These values are significantly greater than the sigma value of 63 which a chromium oxide would have to exhibit to be equivalent to gamma ferric oxide.

The invention is illustrated further by the following examples in which the proportions of ingredients are expressed in parts by weight unless otherwise noted.

EXAMPLE I

A flexible platinum tube is charged with 3.25 parts of chromium trioxide, 0.37 part of water, and 0.05 part of ruthenium dioxide (the finely divided material available commercially). The tube is sealed and then placed in a water-filled pressure vessel and heated to 400° C. under a pressure of 500±50 atmospheres for 3 hours. The pressure is maintained as the reaction vessel is cooled to room temperature and after depressuring, the platinum tube is removed and carefully opened. The black aggregated solid reaction product is removed, crushed in an agate mortar, and washed by placing the product in distilled water and heating the water to boiling. This washing is repeated two more times and then the washed product is collected on a filter, rinsed thoroughly with distilled water and then with acetone and allowed to dry in the air at room temperature. The product obtained is a black, strongly magnetic powder amounting to 2.69 parts and having an intrinsic coercive force of 168 oersteds and a sigma value, $\sigma_s$, of 73 e.m.u./g. This product is found to contain 60.6% chromium.

A sample of a chromium oxide prepared in the same way as described in Example I with the single exception that ruthenium dioxide was not present has a coercive force of only 41.5 oersteds.

EXAMPLE II

A flexible platinum tube is charged with 4.3 parts of $CrO_3$, 0.75 part of water, and 0.025 part of ruthenium dioxide. The tube is then sealed and placed in a water-filled pressure vessel and heated at 400° C. for 3 hours under a pressure of 650–750 atmospheres. After cooling, the flexible platinum tube is opened and the black magnetic product obtained is worked up as described in Example I. There is obtained 3.50 parts of chromium oxide having an intrinsic coercive force of 224 oersteds and a sigma value, $\sigma_s$, of 78.3 e.m.u/g.

EXAMPLE III

A ferromagnetic chromium oxide is prepared as described in Example II with the single exception that 0.05 part of ruthenium dioxide is used instead of 0.025 part. There is obtained 3.53 parts (99% of the theory) of a ferromagnetic chromium oxide having an intrinsic coercive force of 271 oersteds and a sigma value, $\sigma_s$, of 74 e.m.u./g. This chromium oxide is in the form of acicular particles 0.05–1.0 micron in length and with axial ratios, i.e., the ratio of length to width, ranging from 5–35:1. Low coercive force chromium oxides have particles which are much longer, i.e., up to about ten microns or more in length.

The X-ray diffraction pattern exhibited by the chromium oxide of Example III defines a tetragonal crystal structure of the rutile type. The principal reflection lines of this product are listed in the following table, in which the column headed "*d*" gives the interplanar spacings in Angstrom units, and the column headed "I" gives the relative reflection intensities based on a value of 100 for the strongest reflection.

| *d* | I | *d* | I |
|---|---|---|---|
| 3.134 | 100 | 1.562 | 8 |
| 2.438 | 38 | 1.458 | 6 |
| 2.135 | 15 | 1.397 | 4 |
| 1.637 | 33 | ---- | ---- |

EXAMPLE IV

A flexible platinum tube is charged with 140 parts of chromium trioxide, 24 parts of distilled water and 1.5 parts of ruthenium dioxide. The tube is then sealed, placed in a water-filled pressure vessel, and heated to 400° C. under 725±25 atmospheres for a period of 3 hours. After this heating period, the reaction vessel is cooled under pressure and the product is isolated and worked up as described in Example I. The ferromagnetic chromium oxide is then subjected to a final drying step consisting of heating to 150° C. for 18 hours at 1 mm. mercury pressure. The yield is 116.5 parts of product containing 60.32% Cr and 0.83% Ru. The X-ray diffraction pattern is like that of Example III and the principal reflection lines and intensities are listed in the following table.

| *d* | I | *d* | I |
|---|---|---|---|
| 3.113 | 100 | 1.560 | 13 |
| 2.431 | 49 | 1.456 | 11 |
| 2.130 | 21 | 1.394 | 5 |
| 1.974 | 8 | 1.319 | 14 |
| 1.633 | 44 | 1.314 | 23 |

The ferromagnetic chromium oxide of Example IV has a coercive force of 285 oersteds and a sigma value, $\sigma_s$, of 79.5 e.m.u./g. This material is suitable for use in the magnetic coating on magnetic recording tapes.

A magnetic recording tape is prepared as follows. A dispersion is prepared by milling 50 parts of the chromium oxide of Example IV in 130 parts of toluene, 4 parts of methanol, 1 part of the dioctyl ester of sodium sulfosuccinic acid, and 1 part of methylol stearamide in a glass bottle half filled with ¼" glass beads for 17 hours. To the resulting dispersion is added 25 parts of a 20% solution of polyvinyl butyral resin in toluene, and the milling is continued for another 7 hours. The dispersion is coated onto a 1-mil polyethylene terephthalate film by means of a doctor knife set at 5 mils clearance. The coated film is then dried, leaving a coating 0.5 mil in thickness. The coercive force of the ferromagnetic chromium oxide on the coated tape is 314 oersteds.

This tape, having a coating of the chromium oxide of Example IV, is tested for performance in a magnetic tape recorder (Ampex #307) at a tape speed of 30" per second with optimum bias current. The tape is subjected to a constant sound input at several frequencies between 1 and 20 kc. The output signals at these different frequencies are then measured, in decibels, and the results are tabulated below. For purposes of comparison, the results of a similar test on a tape made in exactly the same way except that there is used a ferromagnetic chromium oxide prepared by method of U.S. patent application Ser. No. 515,521 without the use of ruthenium dioxide and having a coercive force of only 81 oersteds (determined with the chromium oxide applied to the tape).

*Magnetic tape performance*

| | Chromium Oxide of Example IV | Chromium Oxide Prepared Without $RuO_2$ |
|---|---|---|
| | *Decibels* | *Decibels* |
| Signal input (constant for all frequencies) | 10.5 | 11.2 |
| Signal Output, at 1 kc | 3.4 | −2.5 |
| Signal Output, at 5 kc | 1.8 | −4.5 |
| Signal Output, at 10 kc | 1.3 | −5.7 |
| Signal Output, at 20 kc | −1.5 | −9.7 |

These results show the marked improvement in the performance characteristics of the high coercive force chromium oxides of the present invention. The tape made from the high coercive force chromium oxide shows a greater signal output at all frequencies, together with a greater uniformity of signal output at different frequencies in the range tested.

EXAMPLE V

Two flexible platinum tubes, A and B, are each charged with 4 parts of chromium trioxide and 0.4 part of water. In addition, 0.05 part of ruthenium dioxide is added to tube A and 0.05 part of a high coercive force chromium oxide containing 1.1% of ruthenium dioxide (the product of Example IV containing 0.83% Ru) is added to tube B. Both tubes are sealed and then heated in a pressure vessel at 400° C. under 725±25 atmospheres of pressure for 0.5 hour. After cooling under pressure, the pressure vessel is opened and the products isolated from the platinum tubes are worked up in the manner described in Example I. The amounts of chromium oxide obtained in each tube and the properties of the products are tabulated below:

| | A | B |
|---|---|---|
| Amounts, parts by wt | 3.2 | 3.18 |
| $H_{ci}$, oersteds | 237 | 144 |
| $\sigma_s$, e.m.u./g | 71.5 | 77.2 |

When the process of Example V–B is repeated with the single exception that an equal amount of the chromium oxide product of Example V–B which contains approximately 0.008% Ru is used instead of the chromium oxide of Example IV and the products are worked up in an identical manner, the ferromagnetic chromium oxide obtained has a coercive force of only 61 oersteds. The high coercive force chromium dioxide of Example V–B containing about 0.01% ruthenium dioxide contains insufficient ruthenium dioxide to catalyze the formation of more high coercive force chromium oxide.

EXAMPLE VI

A flexible platinum tube is charged with 15 parts of chromium trioxide, 2.55 parts of water and 0.13 part of ruthenium dioxide and the tube is sealed. The sealed tube is placed in a helium-filled pressure vessel and heated to 325°–330° C. under a pressure of 240±5 atmospheres for a period of 3 hours. After cooling, the flexible platinum tube is opened and the black, finely divided solid product is washed three times in boiling water and dried thoroughly. There is obtained a black, strongly magnetic chromium oxide having an intrinsic coercive force of 381 oersteds and a sigma value, $\sigma_s$, of 70.2 e.m.u./g.

EXAMPLE VII

A pressure vessel lined with the corrosion-resistant alloy known commercially as "Hastelloy" C is charged with 100 parts of chromium trioxide, 38 parts of water and 0.86 part of ruthenium dioxide. The vessel is closed and oxygen is introduced to provide a pressure of 195 atmospheres at room temperature. The reaction vessel is then heated to 400°–402° C. and maintained at this temperature for 3 hours. The pressure under these conditions is 670–760 atmospheres. The reaction vessel is cooled, then depressured, and opened. The product is washed three times in boiling water. There is obtained finely divided ferromagnetic chromium oxide having an intrinsic coercive force of 172 oersteds and a sigma value, $\sigma_s$, of 67.7 e.m.u./g.

EXAMPLE VIII

A flexible platinum tube is charged with 140 parts of $CrO_3$, 24.5 parts of water and 1.63 parts of high coercive force ferromagnetic chromium oxide ($H_{ci}$=293) made by the process of Example IV. The tube is sealed and then placed in a pressure vessel filled with nitrogen and heated to 400° C. under a pressure of 700–750 atm. for 3 hours. After the pressure vessel is cooled and depressured, the flexible platinum tube is opened and the black ferromagnetic chromium oxide worked up as described in Example I. There is obtained 104 parts of chromium oxide having a coercive force of 176 oersteds and a sigma value, $\sigma_s$, of 82.5 e.m.u./g.

EXAMPLE IX

A sample of high coercive force ferromagnetic ruthenium-modified chromium oxide of this invention is compressed at 395° C. and 22,000 kg./cm.$^2$ to form a tablet 0.133 inch thick with a diameter of 0.3515 inch. The density of the tablet is 4.5 g./cc. The tablet is strongly magnetic and has a coercive force of 160 oersteds.

The ferromagnetic chromium oxides of this invention having intrinsic coercive forces of more than 140 oersteds are especially valuable for use in those applications requiring magnetic particles of high coercive force, for example, in magnetic recording tapes, drums and records.

The ferromagnetic chromium oxides of this invention also possess significantly higher sigma values $\sigma_s$, than gamma ferric oxide which is now used commercially in the manufacture of magnetic tapes. This makes the chromium oxides of this invention particularly useful as in magnetic coatings on recording tapes.

The ferromagnetic chromium oxides of this invention are also useful in other applications, especially in the manufacture of ceramic bodies, such as magnetic cores. More particularly, they are useful in magnetic memory cores for computers, in microwave attenuators, in gyrator elements, in electrically operated high frequency switches, and in low loss transformer cores for megacycle/second frequency ranges. For example, compacted, ruthenium-modified chromium oxides such as described in Example IX are useful as forcusing magnets and in gyrator elements.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A ruthenium-modified chromium oxide ferromagnetic composition containing 58.4% to 61.9% chromium combined with oxygen and 0.008% to 4.4% ruthenium combined with oxygen, and consisting essentially of small acicular particles of tetragonal crystal structure having an average length of not more than 2 microns.

2. A ruthenium-modified chromium oxide ferromagnetic composition containing 58.4% to 61.9% chromium combined with oxygen and 0.008% to 4.4% ruthenium combined with oxygen, having an intrinsic coercive force above 140 oersteds and consisting essentially of small acicular particles of tetragonal crystal structure having an average length of not more than 2 microns with no more than 10% of the particles having a length greater than 2 microns, and having a ratio of length to width within the range of 4:1 to 35:1.

3. A ruthenium-modified chromium oxide ferromagnetic composition as set forth in claim 2 in which said ruthenium-modified chromium oxide ferromagnetic composition has an intrinsic coercive force of between 220 and 400 oersteds.

4. A magnetic recording member which comprises a carrier of non-magnetic material having bonded thereto a ruthenium-modified chromium oxide ferromagnetic composition as set forth in claim 2 and a binder therefor.

5. A ruthenium-modified chromium oxide ferromagnetic composition as set forth in claim 2 in which said ruthenium-modified chromium oxide ferromagnetic composition has a sigma value, $\sigma_s$, within the range of 70 to 85 e.m.u./g.

6. A magnetic recording member which comprises a carrier of non-magnetic material having bonded thereto a ruthenium-modified chromium oxide ferromagnetic composition as set forth in claim 3, and a binder therefor.

7. Process for preparing a ferromagnetic chromium oxide of high coercive force which comprises heating at a temperature within the range of 300° to 500° C. and under a pressure of at least 200 atmospheres, chromium trioxide in the presence of water and from 0.01% to 5% of ruthenium dioxide, based on the weight of the chromium trioxide, and separating and drying as the resulting product a ferromagnetic chromium oxide of high coercive force.

8. Process for preparing a ferromagnetic chromium oxide of high coercive force which comprises heating at a temperature within the range of 325° to 450° C. and under a pressure of 200 to 3000 atmospheres, chromium trioxide in the presence of water and from 0.01% to 5% of ruthenium dioxide, based on the weight of the chromium trioxide, and separating and drying as the resulting product a ferromagnetic chromium oxide of high coercive force.

9. Process for preparing ferromagnetic chromium oxide of high coercive force which comprises heating at a temperature within the range of 300° to 500° C. and under a pressure of at least 200 atmospheres, chromium trioxide in the presence of water and ferromagnetic chromium oxide containing from 0.01% to 5% of ruthenium dioxide, based on the weight of the chromium trioxide, and separating and drying as the resulting product a ferromagnetic chromium oxide of high coercive force.

10. Process for preparing a ferromagnetic chromium oxide of high coercive force as set forth in claim 7 wherein said ruthenium dioxide is from 0.1% to 1.5% based on the weight of the chromium trioxide.

11. Process for preparing ferromagnetic chromium oxide of high coercive force which comprises heating at a temperature within the range of 325° to 450° C. and under a pressure of 200 to 3000 atmospheres, chromium trioxide in the presence of water and ferromagnetic chromium oxide containing from 0.01% to 0.1% of ruthenium dioxide, based on the weight of the chromium trioxide, and separating and drying as the resulting product a ferromagnetic chromium oxide of high coercive force.

12. A ferromagnetic composition of high coercive force consisting essentially of acicular particles of ferromagnetic chromium oxide of tetragonal crystal structure having an average length of not more than 2 microns and a width ranging between 0.02 and 0.2 micron, said ferromagnetic composition containing 58.4% to 61.9% chromium combined with oxygen and 0.008% to 4.4% ruthenium combined with oxygen and showing by X-ray diffraction only a single crystal structure and that the tetragonal crystal structure.

References Cited in the file of this patent

UNITED STATES PATENTS 2,699,408 Camras ---------------- Jan. 11, 1955

OTHER REFERENCES

Comptes Rendus, vol. 219, July 10, 1944, pages 58–60.

J. American Chemical Society, vol. 74, pages 2362–2364 (1952).